United States Patent [19]

Rouverol

[11] 4,149,431

[45] Apr. 17, 1979

[54] PRELOADED CONFORMAL GEARING

[76] Inventor: William S. Rouverol, P.O. Box 9122, Berkeley, Calif. 94709

[21] Appl. No.: 869,318

[22] Filed: Jan. 13, 1978

[51] Int. Cl.² ............................................. F16H 55/06
[52] U.S. Cl. ..................................................... 74/462
[58] Field of Search ......................... 74/461, 462, 443

[56] References Cited

U.S. PATENT DOCUMENTS

| | | | |
|---|---|---|---|
| 2,207,290 | 7/1940 | Hale | 74/443 |
| 2,955,481 | 10/1960 | Jackel | 74/461 X |
| 3,709,055 | 1/1973 | Grove | 74/462 |
| 3,982,445 | 9/1976 | Rouverol | 74/462 |
| 4,031,770 | 6/1977 | Ishikawa | 74/462 |
| 4,051,745 | 10/1977 | Ishikawa | 74/462 |

*Primary Examiner*—Leonard H. Gerin
*Attorney, Agent, or Firm*—Gordon Wood

[57] ABSTRACT

The invention discloses a form of gearing that is radially preloaded and utilizes closely conforming teeth. The preloading ensures that the higher torque capacity of conformal teeth can be realized more fully than in fixed center gearing, and the conformal tooth profiles, if concave-convex, ensure that the amount of preload needed is minimized, since the effective pressure angle for such teeth diminishes as the transmitted torque increases.

33 Claims, 11 Drawing Figures

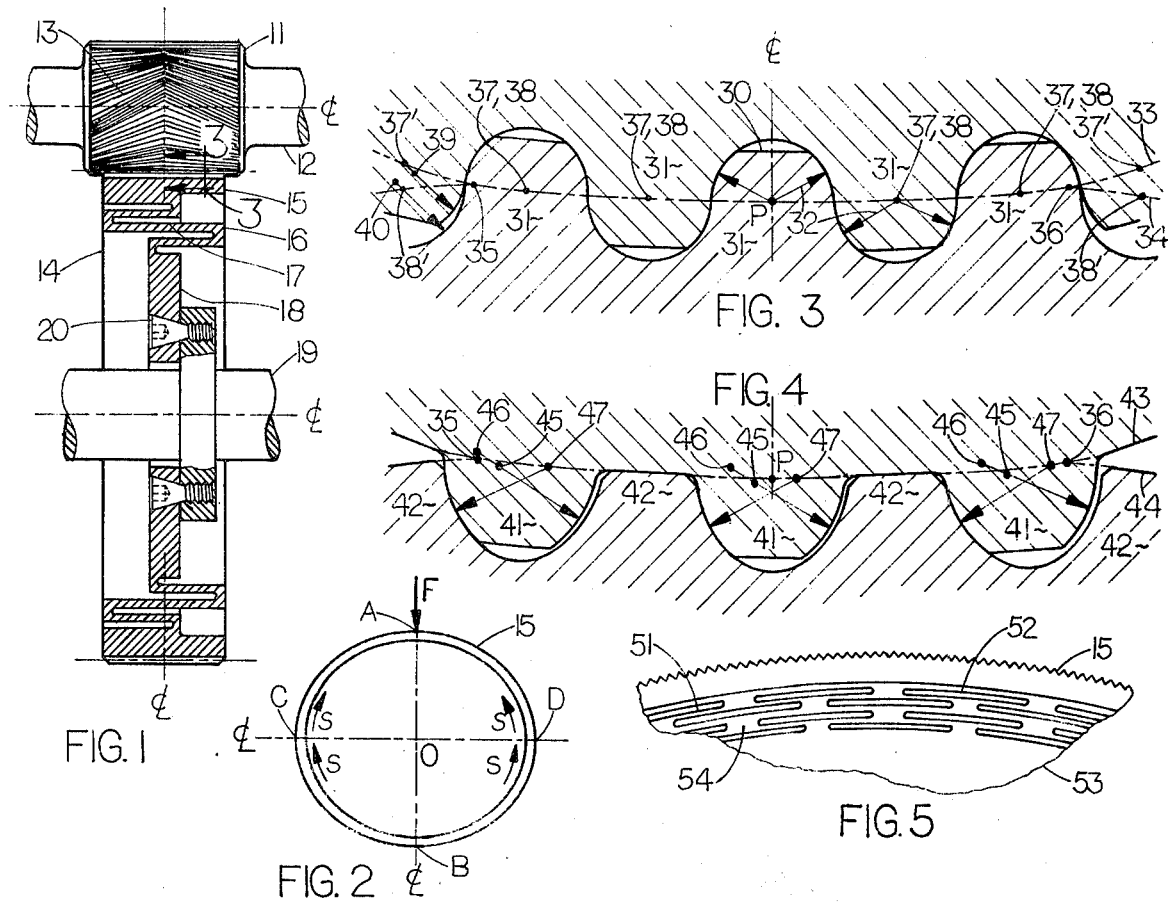
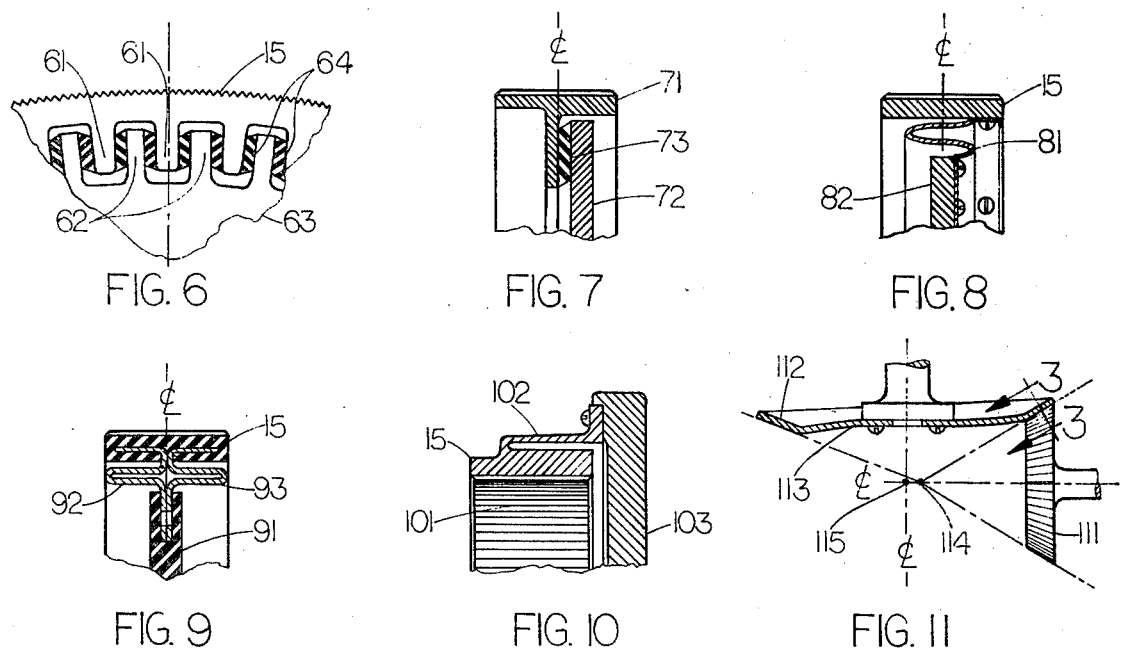

PRELOADED CONFORMAL GEARING

The gearing herein disclosed is essentially an improvement over gearing disclosed in prior art U.S. Pat. Nos. 3,169,408 and 3,304,795. These earlier patents proposed gearing in which the teeth were conformal, but the radial preload was to be applied by the local resilience of the material of the teeth themselves and the rim region immediately beneath the teeth. In practice this construction was found to afford a very restricted torque capacity because the application of the preload by the resilience of the tooth and rim material close to the pitch point required the use of pliable materials for teeth and rim having a very low modulus of elasticity. When a large torque was applied to the gears, tangential shear deformation of the teeth and rims caused the pitch of the teeth coming into mesh to be reduced on the driving gear and increased on the driven gear. As a result, the incoming teeth had a tendency to climb up the flanks of the driven teeth, especially if the pressure angle was higher than the friction angle as was often the case with the preferred tooth material, which was identified as elastomeric. If this "tooth climbing" continued for more than a few pitch lengths, it would progress to the point at which the teeth would actually climb over each other or "ratchet".

The second of the two patents cited, U.S. Pat. No. 3,304,795, sought to correct this problem by increasing the tangential rigidity of the rim material. This alleviated the problem to some extent, but because this patent retained the idea of applying the preload by means of the resilience of the rim material immediately adjacent to the pitch point the materal of the teeth and the surface of the rim between adjacent teeth had to remain quite pliable in order to transmit the radial preloading force through the teeth. The tooth climbing problem was therefore not entirely corrected.

The present invention undertakes to provide a construction that completely eliminates the climbing problem by utilizing a much more rigid tooth and rim construction. When this is done, the preloading force can no longer be developed locally, in the vicinity of the pitch point, but must be generated at a point more or less remote ("spacially displaced") from the pitch point and transmitted to the tooth meshing region through the rim of at least one of the mating gears.

How remote the means that apply the preloading force will be from the pitch point depends on which of several construction types is employed. The most remote means that is suitable for applying a preload to a pair of gears is probably a shaft for one of the gears that has more than usual limberness. This is an economical construction but introduces a considerable degree of lateral movability to one of the gears that tends to promote dynamic instability and effective backlash (or "wind-up").

A more effective but somewhat uneconomical way to provide preloading by means remote from the mesh region is to mount one of the gears on a pivoted arm that is sring-loaded towards the other gear. This is the most common prior art device used for radially preloading gears. Its disadvantage is that is requires a flexible coupling to transmit torque to or from the floating shaft of the pivotally mounted gear.

A more economical way to provide preloading for gears is to build a suitable elastic means into the body of at least one of the gears, then to mount the gears with a reduced center distance or "interference fit". The gear rim is mounted to be movable as a whole if it is relatively rigid, or movable in a localized manner if it is more flexible and is mounted for egging under load. In either case the elastic element incorporated in the gear body must be relatively remote from the tooth contact zone if the teeth and arm are to be rigid enough to prevent tooth climbing. Several alternative constructions utilizing elastic elements in the gear body to impose a preload are disclosed in the drawings.

The use of radial preloading is a well-known method of eliminating backlash in gearing. Gear teeth having closely conforming profiles are also well-known (e.g. U.S. Pat. Nos. 1,601,750; 3,937,098; 3,982,445). Both radially preloaded gears and conformal teeth have inherent disadvantages, however, if used separately: Radial preloading of conventional involute gearing produces excessively high bearing loads and short tooth wear life; conformal gear teeth suffer from reduced torque capacity as a result of acute sensitivity to center-distance error. The proposed constructions eliminate the disadvantages of both radially preloaded gearing and conformal teeth because the disadvantages of each are eliminated by use of conjunction with the other: Radial preloading eliminates the sensitivity of conformal teeth to center-distance error; and convex-concave conformal teeth have a pressure angle that diminishes as the torque load increases, so that a much smaller preload can be used without danger of the teeth riding up over each other when a torque overload occurs. (For involute gearing, shaft deflection causes the pressure angle to increase with torque load, rather than decrease.)

The combining of conformal teeth with radial preloading not only eliminates the disadvantages that characterize each when used by itself, but preserves the important advantages of each. For example, the advantages of conformal gearing relative to involute gearing are as follows: (1) it has typically about twice the torque capacity; (2) it has about twice the tooth deformation under load and is therefore less sensitive to misalignment, pitch and lead-angle errors; (3) its torque capacity is not reduced if the teeth are made finer, so it has considerable potential as a low noise gear form; and (4) it has tooth contact areas that maintain a much thicker oil film and therefore operates more efficiently and wears longer.

The special advantages of radially preloaded gearing relative to gearing that is not preloaded, and which are retained by utilizing this type of gearing in conjunction with conformal teeth, are as follows: (1) it is not sensitive to center-distance errors, since the elastic deflection of the gear that is constructed or mounted to impose the preload is always designed to be much larger than the center-distance errors; (2) its insensitivity to center-distance errors allows the use of teeth that are much finer and therefore much quieter than conventional teeth; (3) preloaded gearing is well-adapted to being made self-aligning, since the structure that preloads the teeth can readily be arranged to apply its load at the mid-plane of the gear face; and (4) preloaded gearing lends itself readily to antibacklash constructions.

Accordingly, the object of the invention is to provide a construction for gearing that affords increased torque and wear capacity as well as reduced noise, and which is also well-suited for antibacklash applications. The means to achieve these and other objects and advantages of the invention will be evident from the drawings as explained in the specification that follows:

FIG. 1 is a gear set embodying the invention, in which a double helical pinion, shown in side view, is mated with a gearwheel shown in diametral section.

FIG. 2 is a schematic axial view of the rim of the gearwheel 1 shown to a greatly reduced scale and illustrating the egging that is induced by a radial load "F".

FIG. 3 is a much enlarged section of the pitch point area of FIG. 1, showing the engaged teeth.

FIG. 4 is a view similar to FIG. 3 showing an alternative tooth form.

FIG. 5 is a partial axial view of a gearwheel such as the one illustrated in FIG. 1, showing an alternative construction for the web.

FIG. 6 is also a partial axial view of a gearwheel showing another alternative construction for the web.

FIGS. 7, 8 and 9 are partial diametral sections of gearwheel rims and webs, showing other alternative constructions.

FIG. 10 is a view similar to FIGS. 7, 8 and 9 but for an internal or "annular" spur gearwheel.

FIG. 11 illustrates the application of the invention to a set of bevel gears, the larger of which, shown in diametral section, preloads its mate by means of the flexure of a membrane-like web.

In detail and referring to FIG. 1, a pinion 11 is mounted on a torque-transmitting central shaft 12 and has double-helical teeth 13 formed on its external surface or "rim". This pinion 11 engages a gearwheel 14 (shown in diametral section) which has a flexible toothed rim 15, immediately inside which is a radially deformable web structure 16. This web structure 16 is deformable under radial load because it has concentric grooves 17 in staggered relation to similar grooves on the opposite side of the web structure 16. If the gearwheel 14 is large, there will also be a solid or relatively rigid web portion 18 between the deformable web structure 16 and the central shaft 19. Web portion 18 is fixed to a collar on shaft 19 by means of conical-headed screws 20 that shift the gear web portion 18 radially, to apply the preload as they are tightened.

The purpose of the deeply grooved web structure 16 of the gearwheel 14 is to provide a connetion between the gearwheel rim 15 and the rigid web portion 18 that can sustain considerable radial deformation but will be quite resistant to tangential shear deformation. The construction shown takes advantage of the fact that a thin-walled sleeve of any appreciable length can readily be egged at one end while the other end is constrained to remain cylindrical, or constrained to be egged to a lesser extent. If two or more concentric cylindrical sleeve portions, one inside the other, are interconnected at their ends, as in the case of the web structure 16 shown, considerable radial movement of the rim 15 can be accommodated without overstressing the web materials even in a gearwheel 14 of relatively small diameter, particularly if the axial length of the sleeves is of the same order of magnitude of their radii. This may lead to the axial length of the sleeves being at least as great as the face width of the rim 15, as shown.

The concentric sleeve construction of the web structure 16 of FIG. 1 in effect produces radial deformability by utilizing staggered circumferentially extending grooves 17 that make the web structure 16, when viewed in the diametral section of FIG. 1, afford a very sinuous or indirect path between the rigid web portion 18 and the rim 15. There are a variety of shapes this sinuous path may be given, but to attain the necessary radial deformability, the length of a imaginary line lying midway between opposed surfaces of the web structure 16 must be at least 30% longer, and preferably 50% longer, than the thickness of the web structure 16 measured in a directional normal to the pitch surface of the gearwheel 14. In the configuration illustrated, the sinuous path followed by the web structure 16 in the diametral plane is more than four times as long as the overall radial thickness of the web structure 16.

In the construction of FIG. 1, it is the elasticity of the body itself of gearwheel 14 that is utilized to apply the preload. This effect is achieved by mounting the gearwheel 14 and pinion 12 on a center-distance that produces an interference fit. (For the purposes of this specification and the ensuing claims, an "interference fit" means a positioning of the axes of rotation of a pair of gears that requires at least one of them to deform or deflect in a direction normal to the pitch surfaces in the tooth contact zone, in order for the gear set to be assembled. In the case of FIG. 1, this would mean that the distance between the centerlines of pinion 12 and gearwheel 14 must be smaller than the sum of the unstressed or "unpreloaded" pitch radii of the pinion 12 and gearwheel 14.)

The amount of radial deformation needed in order to control the preload within say 10% is not very great. For typical manufacturing tolerances plus bearing wear and thermal effects it is usually adequate to provide for radial deformations of 1 to 3% of the gear radius. A web structure 16 such as shown in FIG. 1 will readily allow this much radial deformation if the wall thickness of the concentric cylindrical sleeve segments is not too great. As is always the case in engineering structures, it is bending, as apposed to direct stress, that produces major deflections. In the construction of FIG. 1 the tangential deflection produced is almost negligible, since none of the elements is subjected to ending in the tangential direction. As a result, the torsional deformation of the web structure 16 is typically only 1 to 20% of its radial deformation, and the elastic backlash or "wind-up" of the body when torque is applied is therefore almost negligible.

As a result of the stiffness of the web structure 16 with respect to torsional loading, the attainment of a 1 to 3% radial deformation requires that the rim 15 be flexible enough to deform by this amount without exceeding the yield point of the rim material. This produces a pattern of loads and deflections shown in FIG. 2, which is a reduced-scale schematic view of a typical flexible rim 15 such as that employed in FIG. 1. If an external radial load F is applied at point A, the flexible rim 15 takes the approximate form of an ellipse with minor axis AB and major axis CD. This "egging" compresses the web structure (16 in FIG. 1, not shown in FIG. 2) at point A, and to a slightly lesser extent at point B on the rim 15 opposite to A, and at the same time extends or thickens the web structure at points C and D, 90° removed from A and B, by at least half as much. Because the web srructure 16 is so much stiffer with respect to shear forces than to radial forces, the main support of the load F is not provided by the web elements between point A and the gearwheel center at O, but is instead provided by shear forces s,s at points C and D. In effect, the semi-elliptical arc DAC is therefore an elastic arch that supports the load F. In other words, it is the resilient rim 15, supported mainly at points C and D, that comprises the principal means that preloads the teeth against each other at point A. (The radial forces exerted by the web structure 16 on the rim 15 are so much smaller than the shear forces s,s that they have been omitted from the diagram of FIG. 2 in the interest of clarity. Torque forces are also omitted, in the interest of clarity; they would consist of a tangential force at A and a pair of forces immediately inside the rim 15 at points A and B, directed opposite to the external tangential force at A, plus additional shear forces uniformly distributed around the inside of the rim 15.)

An additional advantage that may be obtained from the use of a gear body that includes an elastic element in the web is that the toothed rim 15 may be made self-aligning. In the case of the construction of FIG. 1 any tendency of the rim to tilt may be eliminated if the combined diametral section of the rim 15 and web 16 has a principal moment of inertia that coincides with the mid-plane of the rim 15. An alternative, if a rim and web configuration is used for which the principal axes of inertia are not radial and axial with respect to the pitch surface, is to design to ensure that the shear center for the combined diametral section of the rim and web lies in the mid-plane of the rim 15. (The term "shear center" is defined in "Strength of Materials", by S. Timoshenko; van Nostrand, 3rd ed., Part 1, art. 52.)

It should be noted in connection with FIG. 1 that the rim 15 and web structure 16 may have many different forms that meet these requirements with respect to principal axes of inertia or shear center. In all of them, however, it will be found that the radially extending portions that connect the sleeves to rim 15 or web 18 and to adjacent sleeves have a stiffening effect on the structure as a whole. This stiffening may be reduced by cutting small holes in the axial direction through these radially extending portions, peferably every 5 to 10° of circumference.

As indicated above, the principal advantages of preloaded gearing and conformal teeth can only be realized by utilizing them together in the same gear set. And just as there are preloading methods of varying degrees of desirability, there are different types of conformal teeth that afford different advantages. The most generally useful tooth form is illustrated in FIG. 3, which is a transverse section shown by the arrows 3,3 in FIG. 1, greatly enlarged.

In this figure the conformal teeth 31 have circular arc tooth profiles with radii 32 for which the centers are on the pitch circles 33, 34 of the pinion and gear respectively. As a result of the preload, the pitch circles 33, 34 are coalesced throughout a distance 35, 36 that covers at least two circular pitch lengths. In the mesh region between points 35 and 36 there is no relative rotation of the teeth 31 and therefore no relative sliding. During tooth engagement and disengagement near points 35 and 36 there is a slight relative rotation of the teeth, and for this reason it is desirable to form the opposite flanks of the teeth 31 with centers 37, 38 for the addenda and dedenda respectively, that coalesce to a common point because the pitch circles on which they lie are coalesced. This ensures that there can be no binding of the teeth, since the meshed profiles mate like the surfaces of cylindrical sleeve bearings.

It will be noted that the tips 30 of the teeth are flat, so that the tooth addendum profile is not a full semi-circle, as in U.S. Pat. No. 3,709,055, but is instead a pair of discrete circular arcs having the same center. In effect, the tooth height is less than half the tooth thickness at the pitch surface. This flat tip has three purposes: It provides a region in which debris from tooth wear can accumulate, it allows for finish machining of the ends of roll-formed teeth, and it removes the tooth portion that would prevent the preload from bearing fully on both adjacent tooth flanks, which is a feature that is essential in antibacklash gear sets.

In conformal gearing, mating teeth may be in contact over most or all of the tooth height. If the tooth profile has considerable changes of curvature, as in the case of the teeth of FIG. 3 that have working profiles including both convex and concave circular arcs, the term "pressure angle" as used in relation to conventional gear forms has a rather indefinite meaning. It is therefore preferable to use the term "transverse profile tangent angle" with respect to a particular point on the tooth profile, meaning the angle in the transverse plane between a line tangent to the profile curve and a line normal to the pitch surface through the point in question. Alternatively, the term "effective pressure angle" may be used to describe the angle between the resultant tooth pressure component in the transverse plane and a line tangent to the coalesced pitch surfaces at the point where they intersect the tooth profile.

In the case of the tooth profiles shown in FIG. 3, the "effective pressure angle" varies greatly depending on the tangential force (or "useful tooth load component") and the relation it bears to the preload. When there is no torque applied, the main tooth load is near the end of the addendum, where the transverse profile tangent range should be at least 30° and preferably 50 to 60°. As torque is applied, more and more of the tooth pressure is carried by the tooth profile portion near the pitch surface, where the transverse profile tangent angle approaches zero. This means that the radial forces developed between mating teeth and tending to separate the gears do not increase linearly with applied torque, but may instead be almost independent of applied torque. This is a very desirable feature, as it means the preload can be much smaller than it would otherwise need to be to make the teeth safe against "ratcheting" during momentary overloads. The general shape the profiles must have to ensure that the separating force decreases rather than increases as torque load is applied, is that the transverse profile tangent angle for profile points of the teeth of both gears increases with distance from the repsective pitch surfaces of the gears.

As there are important advantages in making the teeth of preloaded gears as fine as possible, so as to minimize noise, wear and cost of manufacture (usually by roll-forming), the preferred tooth modules will be from about 0.2 to 0.02. In the case of plastic gears, however, the tooth size may be somewhat larger. In most applications, the teeth can be made fine enough so spur (or straight bevel) teeth will operate very smoothly, and the double-helical teeth shown in FIG. 1 are not required.

It should be noted in connection with the tooth profiles shown in FIG. 3 that in order to prevent overloading of the tips of the teeth and reduce engagement shock. It is desirable to make the radii of the convex circular arcs, when the teeth are unloaded, slightly shorter than those of the concave radii, by an amount that is usually less than 10%. When the teeth are fully loaded, the arc center for the convex arc 39 moves to a point 37' farther from the tooth profile as a result of the tendency of the tooth pressure to reduce the curvature of the tooth surface slightly. Similarly, the arc center for the concave arc 40 moves to a point 38' closer to the tooth profile as a result of the tendency of the tooth pressure to increase the curvature of the concave tooth. The points 37' and 38' are on the pitch circles 33 and 34 respectively, and when the pitch circles coalesce in the zone 35-36, the points 37' and 38' coalesce at the common arc center points indicated as 37, 38.

FIG. 4 shows an alternative tooth form to that of FIG. 3. In this case the teeth 41 on the pinion have working profiles that are convex circular arcs, while those on the gear are concave circular arcs. In this "all-addendum" form, the bottom lands of the convex teeth 41 and the top lands of the concave teeth 42 lie in the respective pitch surfaces 43, 44 of the pinion and gear on which they are formed. These pitch surface lands thus comprise cylindrical surfaces on which the mating gears can roll on each other without sliding, so there is no tooth wear induced by the preload. This means that opposed, high pressure-angle tooth flanks are not needed for carrying the preload, and if desired, backlash may be provided between mating teeth. On the nonloaded side of the teeth, the arc centers 45 of the convex teeth will be slightly closer to the profile than the arc centers 46 of the concave teeth, but when torque load is carried, these arc centers 45, 46 will coalesce at a common point 47, for reasons indicated above. If the teeth are extremely fine, they may be spur, but otherwise should be helical or, preferably, double helical, for smoother rolling on the cylindrical land surfaces.

In FIG. 4 the convex teeth 41 are shown as being narrower than twice the profile radii. If the space between adjacent concave teeth 42 is widened, the convex teeth 41 may also be made wider so that the point where a line connecting arc centers 45 and 46 crosses the coalesced pitch circles would coincide with the arc center 47. This would give the teeth the same common profile circle flank character as shown in FIG. 3, so there would be no possibility of the teeth binding in applications where there is little or no backlash.

As noted above, if a body is fashioned from a rigid material, to make it deformable it is necessary to shape it so some portion of it is subjected to bending, as distinguished from direct stress. As it is radial deformability that is desired in this case, the beam structure that is to be subjected to bending must extend either axially or circumferentially. In the case of the construction of FIG. 1, the beam elements in effect are the elements that make up the cylindrical sleeves, and therefore extend axially. In FIG. 5 an alternative construction is shown, in which the beam elements 51 extend circumferentially. These beam elements 51 are created by forming a series of circumferentially extending slots 52 arranged in two or more concentric rings immediately inside the flexible toothed rim 15. These slots 52 go completely through the web 53 and are separated by solid sections 54 that are opposite the centers of adjacent slots 52 and transmit the torque from the web 53 to the rim 15. Radial compression causes the slots 52 to be deformed into a slightly hour-glass shape, allowing the rim 15 to assume an approximately elliptic form as in FIG. 2 as points A and B move closer to O.

If two different materials are used, one of which is very rigid relative to the other, it is possible to design webs that have the same elastic characteristics as those illustrated in FIGS. 1 and 5, but which do not employ concentric corrugations or circumferentially extending slots. One such design is shown in FIG. 6, in which radially extending fins 61 are attached to the toothed rim 15 at uniform angular intervals in planes containing the central axis of the gear. Between each pair of adjacent fins 61 is a similar fin 62 attached to the web 63 separated from the fins on the rim 15 by a pad of rubber 64 or other elastomer. Because elastomers have a large Poisson's ratio, the shear modulus is very small, so these radially oriented pads are readily deformable in the radial direction but deform very little in response to loads in the direction tangential to the rim 15.

In the configuration of FIG. 7, the toothed rim 71 has a T-shaped section, so it has limited flexibility. It is connected to a solid web portion 72 by means of a circumferentially extending ring of rubber 73 or other elastomer. This is not a desirable construction for an antibacklash gear set, because the rubber ring 73 deforms as much circumferentially under torque load as it does radially under the preload, but it may be suitable for some application where backlash or "wind-up" is not undesirable.

FIG. 8 shows a modification of the resilient web construction 16 of FIG. 1. In this case the web 16 is made up of a radially deformable ring 81 which in section has a zigzag shape comprising a series of semi-ellipses instead of concentric sleeves, which connects the flexible toothed rim 15 to the solid web 82. This kind of ring is readily fabricated by stamping or spinning of flat sheet metal rings.

FIG. 9 shows another variant on the construction of the gearwheel 14 of FIG. 1, in which a plastic flexible rim 15 is connected to a solid plastic web 91 by a pair of sheet-metal concentric sleeve elements 92, 93 that are arranged symmetrically with respect to the center-line of the rim 15 section. This construction insures that the rim 15 will have no tendency to tilt (i.e., will be self-aligning) under the action of the preload and applied load, and that the resilient web structures 92, 93 will be less subject to cold flow and hysteresis than if the gear were made entirely of plastic.

FIG. 10 shows a construction for an internal or "annular" spur gearwheel. In this case the teeth 101 are formed on the inner surface of the flexible rim 15. Immediately outside rim 15 is a cylindrical sleeve 102 connecting the rim 15 to the solid web 103, but if desired a series of concentric sleeves may be employed, as in the resilient web 16 of FIG. 1. The number of concentric sleeves 102 required is entirely a function of how much radial deformability is needed to ensure the actual preload is reasonably close to the intended preload. The web 103 connects to the central shaft on which the gearwheel is mounted.

FIG. 11 shows a straight bevel pinion 111 mated with a second conical gear 112, which is shown in diametrical section. In this case the preload is applied by flexure of a membrane-like web 113. For the conformal teeth to fit properly, they must be formed as though or a gear set that has an angle between center lines that is slightly larger than 90°. This is because the common pitch cone apex point 114 is slightly displaced from the intersection point 115 of the shaft center lines. It will be evident that as an alternative to the flexible membrane construction of FIG. 11, bevel gears may be constructed in the manner of FIG. 1 simply by making the cylindrical rim 15 and cylindrical sleeve elements frusto-conical instead of cylindrical.

A number of observations may be made regarding the embodiments of the invention illustrated: (1) The grooves and slots shown in FIGS. 1, 5, 9 and 10 are shown undeformed, in the interest of clarity; after assembly of the gear set with an "interference fit", as hereinbefore defined, these grooves would be partly or, in designs intended to be immune from the danger of tooth ratcheting or overstressing of the beam elements during overload, completely closed up as a result of elastic deformation; (2) for platic gears, tooth profiles such as those shown in U.S. Pat. Nos. 3,824,873 (U.S. Pat. No. Re. 28,115), 3,937,098 and 3,982,445 are suitable, as well as the profile types shown in FIGS. 3 and 4; (3) an alternative to the tapered screws 20 shown in FIG. 1 are separate C-clamps or built-in jackscrews or wedges that egg the rim 15 as shown in FIG. 2, if the gear set must be assembled on non-separable shafts; (4) a layer of elastomeric or other high damping material may be cemented to the side of the rim 15 that does not have teeth, to reduce noise emission; (5) if the pinion and gear are both small, it may be desirable to make the pinion resilient instead of, or as well as, the gearwheel; (6) helical teeth that are circular arcs in the normal plane instead of the transverse plane are also envisioned, but will not have the capability to accept relative rotation under preload without binding, unless they are made of plastic; (7) the gear of FIG. 1 could be enlarged to become a rack resiliently supported or if movable could be held against the pinion by one or more rollers; (8) if the teeth of a set of gears are fine enough, they may be conformal, as defined below, even though the mating surfaces are both convex; (9) for good antibacklash characteristics, the resilient web structue 16 of FIG. 1 should have an effective radial load modulus, as hereinbelow defined, that is substantially less than twice its effective tangential shear modulus, as hereinbefore defined; (10) the tooth core materials that show the least tendency to cause "tooth climbing", as described above, are materials that are non-pliable, as hereinbelow defined; (11) hydraulic, pneumatic, or electromagnetic means may also be employed to preload one gear against its mate.

For the purposes of the present specification and the ensuing claims, the following terms shall have the following meanings: "flexible" as applied to the rim structure of a gear means having a ratio of radial thickness to radius that permits said rim structure to sustain a radial deformation of at least ½% without inducing in any part of said rim structure a stress in excess of the yield stress; "effective radial load modulus" means of ratio of (a) the radial load per unit circumferential length of the web structure to (b) the radial deformation produced by that load; "effective tangential shear modulus" means the ration of (a) the tangential shear load per unit circumferential length of the web structure to (b) the shear deformation produced by that tangential shear load; "pinion" means the smaler of a pair of mating gears, except in a unity-ratio gear set where either of the pair may be considered the pinion; "gearwheel" means the larger of a pair of mating gears except in a unity-ratio gear set where either of the pair may be considered the "gearwheel"; in the case of a rack-and-pinion set, the "gearwheel"has an infinite radius and is synonymous with the rack; a "non-pliable" material is one having a modulus of elasticity greater than 350 kp/mm$^2$, and a "pliable" material is one having a modulus of elasticity smaller than this value, as for example an elastomer; "radially preloaded", as applied to gear teeth, means the teeth on one pair of mating gears are urged radially toward the teeth on the other of said pair by forces that act regardless of whether or not the gears are subjected to torque loading; "diametral section" means a section through a gear or its web taken in a plane that contains the central axis of the gear; "conformal", as applied to gear tooth profiles, means the teeth have a relative radius of curvature in the normal plane that causes a transverse section of the tooth contact area to occupy at least two-thirds of the height of the tooth working profile when the gears are subjected to an applied torque that causes the material at the most critical point of whichever gear is weaker to reach a condition of incipient yielding.

I claim:

1. A pair of mating gears comprising a pinion and gearwheel each having a toothed rim, said rim of said pinion being connected to a torque transmitting means, said rim of one of said pair having a portion in the tooth contact zone of said pair that is adapted to sustain components of movement in a direction normal to the pitch surface of said one of said pair in said zone, means spaced apart from said zone and radially preloading the teeth on said portion of said rim against the teeth on the rim of the other of said pair, said teeth having conformal profiles.

2. A pair of mating gears according to claim 1 wherein said means comprises a body for one of said pair formed to deflect radially in response to radial load, and the axes of rotation of said pair are positioned to produce an interference fit between said pair.

3. A pair of mating gears according to claim 1 wherein said rim of said one of said pair is flexible.

4. A pair of mating gears according to claim 3 wherein said flexible rim is supported on a web having an effective radial load modulus that is less than twice its effective tangential shear modulus.

5. A pair of mating gears according to claim 4 wherein a line lying in a diametral section and positioned midway between opposed surfaces of said web structure and extending from the innermost to the outermost part of said web structure has a length at least 30% greater than the thickness of said web structure measured in a direction normal to the pitch surface of said teeth on said flexible rim.

6. A pair of mating gears according to claim 5 wherein said length is at least 50% greater than said thickness.

7. A pair of mating gears according to claim 4 wherein said web structure is immediately inside said flexible rim.

8. A pair of mating gears according to claim 4 wherein said web structure is immediately outside said flexible rim.

9. A pair of mating gears according to claim 1 wherein the pitch surfaces of said toothed rims are frus-to-conical.

10. A pair of mating gears, according to claim 1 wherein said rim of said one of said pair is made of a non-pliable material.

11. A pair of mating gears according to claim 1 wherein said means comprises a pliable element in said web structure.

12. A pair of mating gears according to claim 4 wherein said web structure is symmetrical with respect to the mid-plane of said flexible rim.

13. A pair of mating gears according to claim 4 wherein one of the principal moments of inertia of said flexible rim and said web structure combined coincides with the mid-plane of said flexible rim.

14. A pair of mating gears according to claim 4 wherein the shear center of said flexible rim and said web structure combined, lies in the mid-plane of said flexible rim.

15. A pair of mating gears according to claim 4 wherein said web structure includes a cylindrical sleeve portion.

16. A pair of mating gears according to claim 4 wherein said web structure includes a plurality of interconnected cylindrical sleeve portions.

17. A pair of mating gears according to claim 4 wherein said web structure has a plurality of circumferentially extending slots arranged in a plurality of concentric rings, said slots and the solid sections between circumferentially adjacent slots in each of said rings being in staggered relation to the slots and solid sections of adjacent rings.

18. A pair of mating gears according to claim 3 wherein the magnitude of the modulus of rigidity of said flexible rim causes it to deform radially, at points 90° displaced from the pitch point, at least half as far as it does in said tooth contact zone.

19. A pair of mating gears according to claim 1 wherein the working profiles of said teeth are circular arcs.

20. A pair of mating gears according to claim 1 wherein said teeth have lands that lie in their respective pitch surfaces.

21. A pair of mating gears according to claim 1 wherein said gear teeth have transverse profile tangent angles of at least 30° at a point in the working surface of said profiles.

22. A pair of mating gears according to claim 1 wherein each of said teeth has an active profile that includes both convex and concave portions.

23. A pair of mating gears according to claim 1 wherein the core of said teeth is comprised of a material having a modulus of elasticity greater than 350 kp/mm$^2$.

24. A pair of mating gears according to claim 1 wherein the working surfaces of opposite sides of the teeth on one of said pair include profile portions comprising two circular arcs having a common center.

25. A pair of mating gears according to claim 1 wherein the surfaces of the space between adjacent teeth in one of said pair include profile portions comprising two circular arcs having a common center.

26. A pair of mating gears according to claim 19 wherein the radius of said circular arc profiles on the teeth of one of said pair is not more than 10% larger than the radius of said circular arc profiles on the other of said pair.

27. A pair of mating gears according to claim 1 wherein the addendum height of the teeth of one of said pair is less than half the tooth thickness at the pitch surface of said one of said pair.

28. A pair of mating gears according to claim 24 wherein said profile portions have a common center only when said teeth are deformed by said radial preloading.

29. A pair of mating gears according to claim 1 wherein said teeth are double helical.

30. A pair of mating gears according to claim 1 wherein the transverse profile tangent angle for profile points of the teeth of both of said gears increases with the distance of said points from the respective pitch surfaces of each of said gears.

31. A pair of mating gears according to claim 19 wherein the centers of said circular arcs lie adjacent to respective pitch surfaces of said gears.

32. A pair of mating gears according to claim 1 wherein threaded means are provided to force one of said gears against the other of said gears to produce said radial preloading.

33. A pair of mating gears according to claim 1 wherein the module of said teeth is smaller than 0.2.

* * * * *